United States Patent [19]

Breuers

[11] Patent Number: 4,580,491

[45] Date of Patent: Apr. 8, 1986

[54] APPARATUS FOR THE EMBOSSING OF CABLE MARKING RINGS

[75] Inventor: Manfred O. Breuers, Rödermark, Fed. Rep. of Germany

[73] Assignee: Idento Gesellschaft für industrielle Kennzeichnung mbH, Rödermark, Fed. Rep. of Germany

[21] Appl. No.: 720,872

[22] Filed: Apr. 8, 1985

[30] Foreign Application Priority Data

May 22, 1984 [DE] Fed. Rep. of Germany ....... 3419027

[51] Int. Cl.⁴ .......................... B41F 17/00; H01B 7/36
[52] U.S. Cl. ............................................ 101/4; 269/47
[58] Field of Search ............ 269/52, 47; 101/4, 9–11, 101/35, 41, 44

[56] References Cited

U.S. PATENT DOCUMENTS 3,732,807  5/1973  Robertson .............................. 101/11
3,768,401  10/1973  Sahm et al. ............................. 101/4
4,032,010  6/1977  Evans ................................. 269/47 X
4,126,936  11/1978  Koller ................................. 101/4 X

FOREIGN PATENT DOCUMENTS 1577969  5/1970  Fed. Rep. of Germany ........ 101/35
2655958  10/1979  Fed. Rep. of Germany .

Primary Examiner—Clifford D. Crowder
Attorney, Agent, or Firm—Burns, Doane, Swecker & Mathis

[57] ABSTRACT

An embossing tool is employed for embossing a plurality of cable marking rings. The tool comprises upper and lower embossing heads which are movable against each other. The cable marking rings to be embossed are held on two parallel holding pins which are supported movably in a support body by means of elastic bushings. One of the embossing heads is equipped on each one of two opposing sides with a centering fork comprising centering slots in which the holding pins are centered during the embossing process.

7 Claims, 3 Drawing Figures

APPARATUS FOR THE EMBOSSING OF CABLE MARKING RINGS

BACKGROUND AND OBJECTS OF THE INVENTION

The invention concerns an apparatus for the embossing of a plurality of cable marking rings formed of a synthetic plastic material, the embossing tool comprising upper and lower embossing heads moving against each other.

Longitudinally slit cable marking rings carrying, on two opposing sides, embossed and colored markings, for example numbering or lettering, are known from German DE-P No. 26 55 958.

The embossings to be applied to opposing sides of the cable marking rings are effected by means of embossing tools comprising embossing heads moving toward and against each other. A particular difficulty involves the holding of the cable marking rings during the embossing step. The marking rings, when being embossed, form portions of a one-piece injection molded body, the rings being interconnected by a web of the body. The forces applied by the embossing dies of the two embossing heads are relatively large, so that there is a risk of the cable marking rings shifting laterally during the double embossing operation, whereby the embossed image is obliterated. In the case of unilateral embossing this difficulty does not arise, as the rings to be embossed may be received and fixed in a lower die.

It is, therefore, an object of the invention to provide an apparatus of the afore-mentioned type, wherein the lateral escape of the cable marking rings during the embossing process is prevented.

SUMMARY OF THE INVENTION

This object is attained according to the invention in that two parallel holding pins for each row of cable marking rings are elastically supported by means of a holding support and that one of the two embossing heads is equipped on each of two opposing sides with a centering form, comprising two centering slots open toward the other embossing head, for receiving the holding pins.

The two centering forks center the two holding pins at both of their ends immediately prior to and during the embossing process in relation to the embossing head equipped with the centering forks, so that the cable marking rings cannot escape laterally. Centering with respect to the other embossing head is effected by the existing tool guide. In order to make possible the effective centering of the holding pins, a limited mobility of the holding pins must be provided at both of their ends. While this mobility is assured at the free ends of the holding pins by their elasticity, the mobility of the other end held in the holding support is attained by an elastic bearing support, according to the invention.

The elastic bearing support may comprise an elastic bearing bush disposed within a bore of the holding support. The holding pins may thereby be displaced with respect to the holding support during the centering process.

Additionally, or alternatively, the holding support may be mounted on a supporting table by means of elastic intermediate bodies. The elastic intermediate bodies provide a limited displaceability of the holding support carrying the holding pins during the centering process.

The supporting table may comprise for example, a turntable, whereby the hold pins may be pivoted into an embossing position in the embossing tool, from a feeder position wherein the cable marking rings were pushed onto the holding pins. The elastic bearing support of the holding pins prevents the appplictaion of excessively high forces during the centering process through the holding support to the turntable. In spite of this, the complete centering of the holding pins and thus of the cable marking rings arranged on them, in relation to the embossing heads of the embossing is assured independently of the accuracy of the turntable.

Preferably, the centering slots widen toward the other embossing head, in order to facilitate the insertion of the holding pins into the centering slot.

The centering forks are preferably mounted on the embossing head in a replaceable manner, so that they may be replaced readily in case of wear.

BRIEF DESCRIPTION OF THE DRAWING

The invention shall be explained hereafter with reference to an example of the embodiment, in a simplified mode of illustration, by which.

DETAILED DESCRIPTION OF A PREFERRED EMBODIMENT OF THE INVENTION

Figure 1:
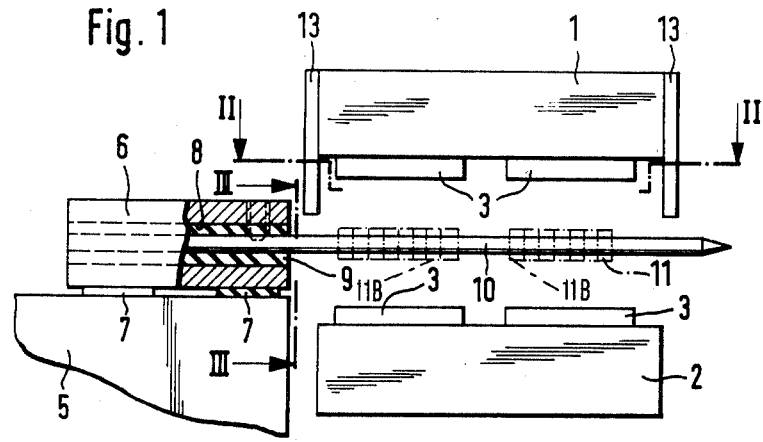
FIG. 1 shows a side elevation of an embossing tool with a holder for the cable marking rings to be embossed.
Figure 2:
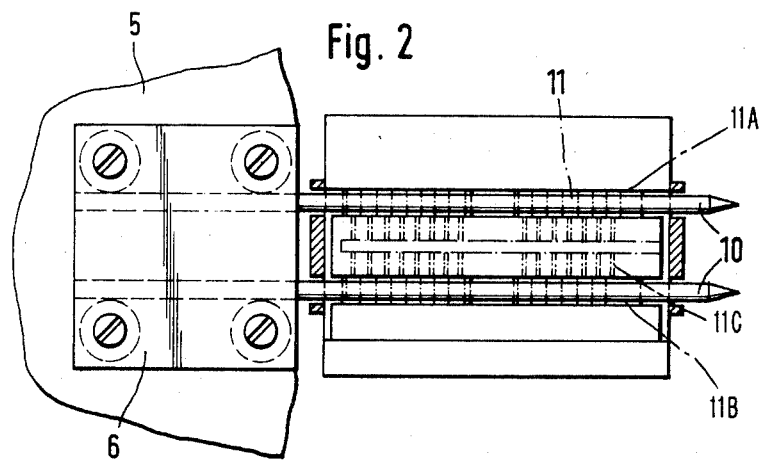
FIG. 2 is a section taken along the line II—II in FIG. 1.
Figure 3:
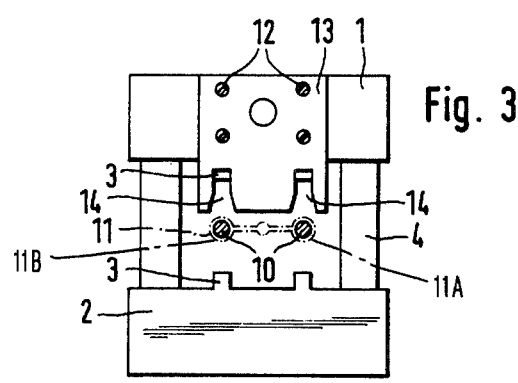
FIG. 3 is a section taken along the line III—III in FIG. 1.

An embossing tool shown in the drawing has an upper embossing head 1 and a lower embossing head 2, each of which carries embossing dies 3. The two embossing heads 1 and 2 are guided by the tool guides 4 (indicated only in FIG. 3), so that they are capable of moving toward each other. The embossing tool is contained in an embossing press (not shown).

On a horizontal turntable 5 located in front of the embossing tool a supporting body 6 is elastically carried on rubber elastic intermediate bodies 7. In two parallel bores 8 of the supporting body 6, rubber elastic bushings 9 are arranged, each carrying a pointed steel holding pin 10. Thus, each pin is capable of limited free movement.

When the turntable is in a feeding position (not shown) the cable marking rings 11 (see the broken lines in the figures) are inserted onto the pins 10. The cable marking rings 11 are arranged in two parallel rows 11A, 11B which are interconnected by an integral interconnecting web 11C so that the rings 11 form portions of a one-piece injection molded body. The rings are pushed directly onto the two parallel holding pins 10. Each row of these cable marking ribs is to be embossed on both its top and bottom sides by means of the embossing dies.

A centering fork 13 is fastened replaceably on two opposing sides of the upper embossing head 1 by means of screws 12. Each of the centering forks 13 comprises centering slots 14 open in the direction of the lower embossing head 2. The slots widen toward their open ends and correspond in their minimal width to the diameter of the holding pins 10 which are preferably of circular cylindrical configuration.

The turntable 5 carries several pairs of holding pins 10 (only one pair being depicted) so that in every rotating position of the turntable, two holding pins 10 are in a feeding position (not shown) and two other holding pins 10 are disposed in the embossing tool.

When the two embossing heads 1, 2 are moved by the embossing press against each other, the pins 10 enter the slots 14 in the centering forks 13 at both ends of the holding pins 10. As a result, the pins are centered with respect to the upper embossing head 1, which in turn, is centered in relation to the lower embossing head 2 by the tool guides 4. Consequently, the cable marking rings 11 are held during the embossing process in a manner such that they cannot escape in the lateral direction, thereby making an obliteration of the image embossed impossible.

The feeder accuracy of the turntable 5 required is relatively low; it is merely necessary to insure that the holding pins 10 receive the cable marking rings 11 in a reliable manner and that the holding pins 10 are positioned in the embossing tool so that they are securely seized and aligned by the centering slots 14 of the centering forks 13.

The elastic support of the holding pins 10 by means of the bushings 9 and the intermediate bodies 7 is effective in (i) the horizontal direction in regard to the centering process on the centering forks 13, and (ii) the vertical direction. Thus, the forces applied to the cable marking rings 11 by the upper embossing head 1 and the lower embossing head 2 is equalized in all directions, especially the vertical direction.

Although the present invention has been described in connection with a preferred embodiment thereof, it will be appreciated by those skilled in the art that modifications, substitutions, additions, and deletions not specifically described, may be made, without departing from the spirit and scope of the invention as defined in the appended claims.

What is claimed is:

1. Apparatus for the embossing of a plurality of cable marking rings formed of a synthetic plastic material, the rings being arranged in at least two parallel rows which form portions of a one-piece injection molded body, said apparatus comprising embossing head means including upper and lower embossing heads, guide means supporting said heads for movement against each other, a holding support, two parallel holding pins carried by said support for limited free movement and arranged to receive the rings of said body, said supporting head means carrying centering fork means having slots arranged to receive each said holding pin adjacent opposite ends of each pin to center said pins with respect to said embossing head means when said embossing heads are moved against one another.

2. Apparatus according to claim 1, wherein said holding pins are supported in elastic bushings in said holding support.

3. Appratus according to claim 1, wherein said holding support is mounted on a holding table by means of rubber elastic intermediate bodies.

4. Apparatus according to claim 3, wherein said holding table comprises a turntable, whereby the holding pins may be pivoted from a feeder position into an embossing position disposed in the embossing tool.

5. Apparatus according to claim 1, wherein said centering slot widens in the direction of the opposing embossing head.

6. Apparatus according to claim 1, wherein said centering fork means is mounted on the embossing head in a replaceable manner.

7. Apparatus according to claim 1, wherein said centering fork means comprises first and second centering forks mounted on opposite ends of one of said embossing heads, each of said centering forks carrying two said slots.

* * * * *